(12) United States Patent
Van Dijk et al.

(10) Patent No.: US 9,684,159 B2
(45) Date of Patent: Jun. 20, 2017

(54) SCANNING MICROSCOPE

(75) Inventors: Erik M. H. P. Van Dijk, Eindhoven (NL); Bas Hulsken, Eindhoven (NL); Cornelius A. Hezemans, Nuenen (NL); Henricus R. M. Verberne, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 444 days.

(21) Appl. No.: 13/139,551

(22) PCT Filed: Dec. 10, 2009

(86) PCT No.: PCT/IB2009/055659
§ 371 (c)(1),
(2), (4) Date: Aug. 17, 2011

(87) PCT Pub. No.: WO2010/070553
PCT Pub. Date: Jun. 24, 2010

(65) Prior Publication Data
US 2011/0292200 A1    Dec. 1, 2011

(30) Foreign Application Priority Data
Dec. 15, 2008  (EP) .................................. 08305943

(51) Int. Cl.
*G02B 21/36* (2006.01)
*G01D 5/347* (2006.01)
*G02B 21/24* (2006.01)

(52) U.S. Cl.
CPC ....... *G02B 21/367* (2013.01); *G01D 5/34746* (2013.01); *G02B 21/245* (2013.01)

(58) Field of Classification Search
CPC ................................. H04N 7/18; G02B 21/367
USPC .............................................. 348/79
See application file for complete search history.

(56) References Cited

U.S. PATENT DOCUMENTS

| | | | | |
|---|---|---|---|---|
| 4,577,940 A | * | 3/1986 | Krasinski | G02B 27/60 |
| | | | | 250/237 R |
| 4,948,971 A | | 8/1990 | Vogen | |
| 5,075,560 A | * | 12/1991 | Greivenkamp, Jr. | G01B 11/026 |
| | | | | 250/237 G |
| 5,075,562 A | * | 12/1991 | Greivenkamp, Jr. | G01B 11/026 |
| | | | | 250/237 G |

(Continued)

FOREIGN PATENT DOCUMENTS

DE   102005018896 A1   10/2006
JP       H04301547 A   10/1992
(Continued)

*Primary Examiner* — Jay Patel
*Assistant Examiner* — Irfan Habib

(57) ABSTRACT

A scanning microscope includes a stage for holding a sample, a scan mechanism, a probing system for probing a region of the sample, a position sensor, and a controller. The scan mechanism is configured to translate the stage between at least two axial positions. The probing system includes an optical element and a photosensor having a readout region, where the readout region extends in a direction which is transverse to an ideal orientation of the stage. The position sensor is configured to measure a transverse position of the stage and/or of an orientation of the stage. The controller is configured to adapt the probing system as a function of the measured transverse position and/or the measured orientation.

16 Claims, 14 Drawing Sheets

(56) References Cited

U.S. PATENT DOCUMENTS

| | | | |
|---|---|---|---|
| 5,307,203 A | 4/1994 | Hill | |
| 5,636,025 A * | 6/1997 | Bieman | G01B 11/2527 250/237 G |
| 6,037,583 A | 3/2000 | Moehler | |
| 6,072,625 A | 6/2000 | Kitahara | |
| 6,262,423 B1 * | 7/2001 | Hell | G02B 21/002 250/458.1 |
| 6,278,113 B1 * | 8/2001 | Murayama | B82Y 35/00 250/442.11 |
| 6,320,174 B1 * | 11/2001 | Tafas | G02B 6/06 250/208.1 |
| 6,426,501 B1 * | 7/2002 | Nakagawa | H01J 37/28 250/252.1 |
| 6,522,774 B1 * | 2/2003 | Bacus | G01N 15/1475 345/629 |
| 6,535,280 B1 * | 3/2003 | La Fontaine | G03F 9/7049 356/123 |
| RE38,113 E | 5/2003 | Nishi et al. | |
| 6,606,149 B1 * | 8/2003 | Ogasawara | H01J 37/304 250/491.1 |
| 6,639,201 B2 | 10/2003 | Almogy et al. | |
| 6,711,283 B1 | 3/2004 | Soenksen | |
| 6,894,271 B2 * | 5/2005 | Widzgowski | G02B 21/0036 250/230 |
| 6,958,819 B1 * | 10/2005 | Heaton | G01D 5/34746 356/401 |
| 7,079,256 B2 * | 7/2006 | Li | A61B 3/1225 356/497 |
| 7,136,708 B2 | 11/2006 | Yamaguchi | |
| 7,184,610 B2 * | 2/2007 | Weinstein | G02B 21/367 359/374 |
| 7,292,515 B2 | 11/2007 | Holtslag et al. | |
| 7,312,919 B2 | 12/2007 | Overbeck | |
| 8,832,859 B2 * | 9/2014 | Afshari | B82Y 35/00 850/1 |
| 2001/0054691 A1 * | 12/2001 | Park | B82Y 35/00 250/309 |
| 2002/0154396 A1 | 10/2002 | Overbeck | |
| 2002/0167723 A1 | 11/2002 | Eda | |
| 2004/0028333 A1 | 2/2004 | Lomas | |
| 2005/0117206 A1 * | 6/2005 | Cheng | G01N 3/48 359/371 |
| 2005/0163398 A1 * | 7/2005 | Ioka | G06T 7/0024 382/284 |
| 2006/0108523 A1 * | 5/2006 | Ue | B82Y 35/00 250/309 |
| 2006/0133657 A1 | 6/2006 | Schmid | |
| 2006/0151716 A1 * | 7/2006 | Choi | B82Y 10/00 250/492.1 |
| 2007/0023684 A1 * | 2/2007 | Lewis | H01J 37/20 250/442.11 |
| 2008/0095467 A1 * | 4/2008 | Olszak | G02B 21/367 382/284 |
| 2008/0259423 A1 * | 10/2008 | Frekers | G02B 21/002 359/199.1 |
| 2008/0279441 A1 * | 11/2008 | Matsuo | G01N 15/1475 382/133 |
| 2009/0028414 A1 * | 1/2009 | Crandall | G02B 21/002 382/133 |
| 2009/0046543 A1 | 2/2009 | De Hoog et al. | |
| 2009/0224169 A1 * | 9/2009 | Sawada | H01J 37/153 250/396 R |
| 2010/0252735 A1 * | 10/2010 | Hytch | H01J 37/26 250/311 |
| 2011/0075255 A1 * | 3/2011 | Kennedy | G02B 21/0076 359/385 |
| 2013/0162802 A1 * | 6/2013 | Soenksen | G02B 21/002 348/79 |

FOREIGN PATENT DOCUMENTS

| | | |
|---|---|---|
| JP | 03053449 B2 | 6/2000 |
| WO | 2005106857 A1 | 11/2005 |
| WO | 2007054884 A2 | 5/2007 |

* cited by examiner

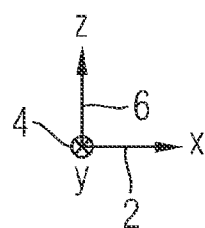
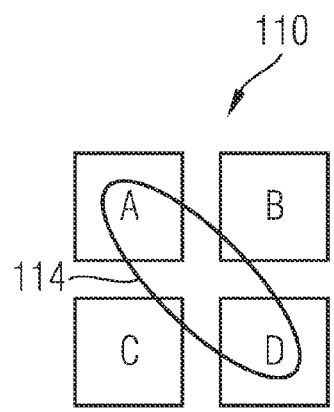 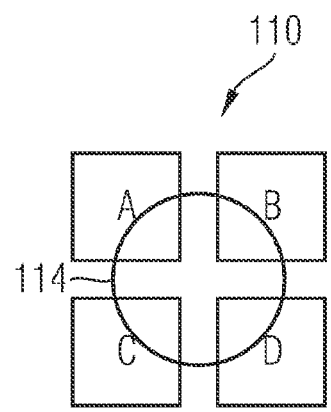 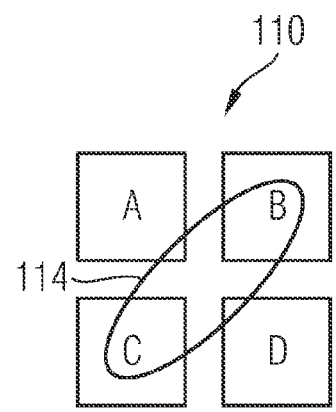
FIG. 15a     FIG. 15b     FIG. 15c
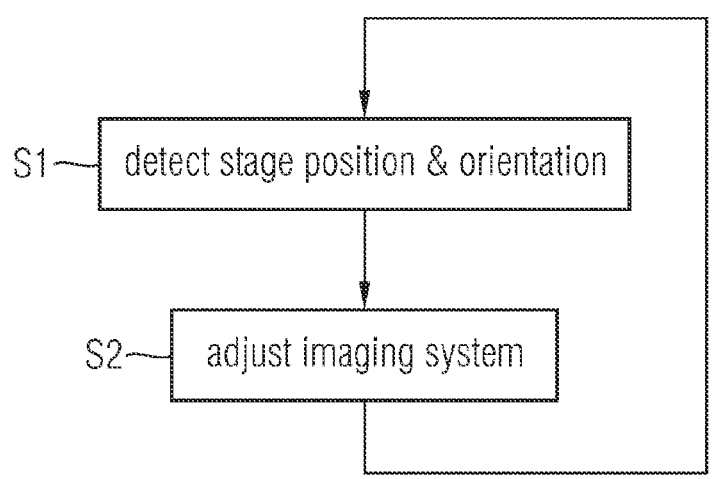
FIG. 17

SCANNING MICROSCOPE

FIELD OF THE INVENTION

The invention refers to a scanning microscope comprising: a stage for holding a sample; a scan mechanism for translating the stage between at least two axial positions, wherein a transverse position of the stage relative to an ideal transverse position may vary, wherein an orientation of the stage relative to an ideal orientation may vary, and wherein each of the at least two axial positions of the stage is associated with a corresponding predefined region to be probed of the sample; a probing system for probing the region of the sample, the probing system comprising an optical element and a photosensor having a readout region, the readout region extending in a direction, which is transverse to the ideal orientation.

BACKGROUND OF THE INVENTION

A digital microscope makes a digital image of a sample. Often this is done by repeatedly scanning up and down and stitching different bands together and/or by overlaying images measured at different wavelengths. For an accurate, artefact-free image it is important that the various image pieces line up accurately. In a line scanning system, where the sample is scanned with a constant velocity in one direction, while a line sensor measures information in the perpendicular direction, two axes can be defined: the scan direction and the lateral direction. Two main sources of errors are firstly variations in the scan velocity and secondly a non-straightness of the travel of the sample. The variations in the scan velocity result in errors in the scan direction. This type of error can be corrected by measuring the position of the stage in the scan direction and triggering the acquisition of the line camera at well-defined and equidistant positions. The non-straightness of the travel of the sample results in errors in the line sensor direction. Depending on the type of stage, the non-straightness is between nanometers and many microns. The degree of non-straightness mainly depends on the bearings used. For most microscopy applications the absolute straightness is less of an issue than the reproducibility. For artefact-free stitching/overlay it is important that the shift between consecutive scans is less than half of a pixel pitch (pixel spacing) in the image. One object of the invention is to provide a device and a method that can be used to compensate errors in the line sensor direction caused by variations in the non-straightness of the travel of the stage. Further, it is an object of the invention to provide a device that has relaxed requirements on the travel accuracy of the stage. In principle, many of these errors could be corrected in post-image processing steps. But, for applications where high data rates are needed and large files are generated post-processing means are very calculation-intensive and time-intensive. Thus, it is preferred to solve these problems directly online. In lithography systems and in optical storage systems similar problems occur. In U.S. RE38,113 E a system is described which interferometrically measures the deviation of a scanning substrate perpendicular to a scan movement. This signal is used to move the sample with an actuator on an axis perpendicular to the direction of the scan movement. Another means of measuring deviation is disclosed in U.S. Pat. No. 7,079,256B2 which describes a system that functions as a non-contact height profiler. Optical storage devices are disclosed in WO2005/106857A1 and WO2007/054884A2 where marks on an information carrier can be interrogated by the readout device in order to correctly position the sample in two dimensions. In these conventional systems the correcting or positioning is done by moving the stage. Such a conventional scanning microscope has a complex structure, a moderate speed, and low cost-efficiency.

It is an object of the present invention to provide a simpler scanning microscope having higher speed and higher cost-efficiency than the conventional scanning microscope. This object is solved by providing a scanning microscope according to the independent claim.

SUMMARY OF THE INVENTION

Therefore, the inventive scanning microscope comprises a position sensor for measuring the transverse position of the stage and/or the orientation of the stage and a controller for adapting the probing system as a function of the measured transverse position and/or the measured orientation. Contrary to the prior-art, the avoiding and/or compensating of errors is not done by physically moving the sample (respectively the stage). The inventive concept allows for a faster, simpler and cheaper system.

The scanning microscope may further comprise a focusing mechanism for translating the stage in a vertical direction, which is transverse to the ideal orientation and which is also transverse to the direction in which the readout region extends.

For every axial position of the stage the region of the sample to be probed can be predefined by an initial transverse position and an initial orientation of the stage.

The controller may be capable of adapting the probing system as a function of the measured transverse position and/or the measured orientation such that the readout region of the photosensor corresponds to the region of the sample to be probed.

Preferably, the controller is capable of adapting the readout region of the photosensor and/or the controller is capable of adapting a selection of data, which has been collected by the photosensor, in particular which has been transmitted to the controller.

It may be advantageous if the controller was capable of translating the readout region of the photosensor in the direction, which is transverse to the ideal orientation and/or if the controller was capable of translating a selection area for selection of data, which has been collected by the photosensor, in particular transmitted to the controller.

It can be also beneficial if the controller was capable of rotating the readout region of the photosensor and/or if the controller was capable of rotating a selection area for selection of data, which has been collected by the photosensor, in particular transmitted to the controller.

The controller may be capable of rotating the readout region of the photosensor about a vertical axis passing through a centre of the readout region.

It is also possible to provide a controller that is capable of moving the photosensor in the direction, which is transverse to the ideal orientation.

The controller may be capable of pivoting the photosensor about a vertical axis.

Preferably the vertical axis passes through a centre of the readout region.

The controller may be capable of moving the optical element.

The optical element may be a lens and/or an array of lenses and/or a pivotable mirror.

The photosensor may be an array of photosensors (22, 23).

The position sensor may comprise a first pattern on the stage and a second pattern on an immobile part of the microscope, wherein the first pattern and the second pattern give rise to a Moiré pattern.

The FIGS. 15a to 15c schematically show footprints of a reflected laser spot on a segmented photosensitive diode for three different positions of the stage.

Figure 16A:
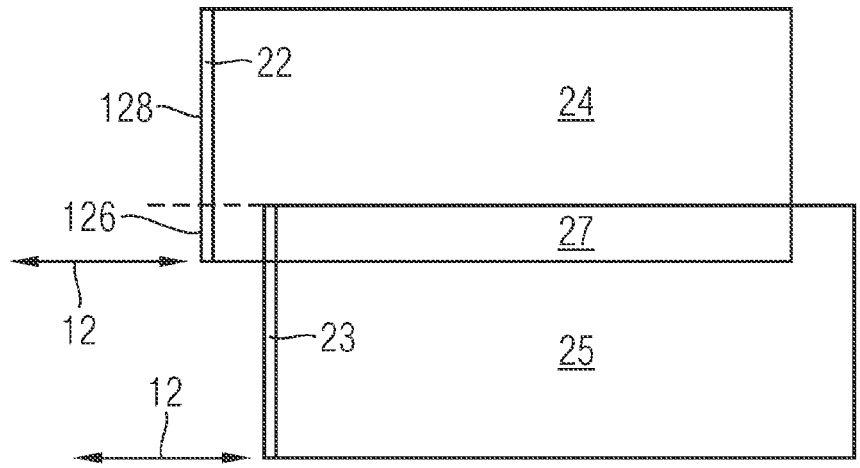
Figure 16B:
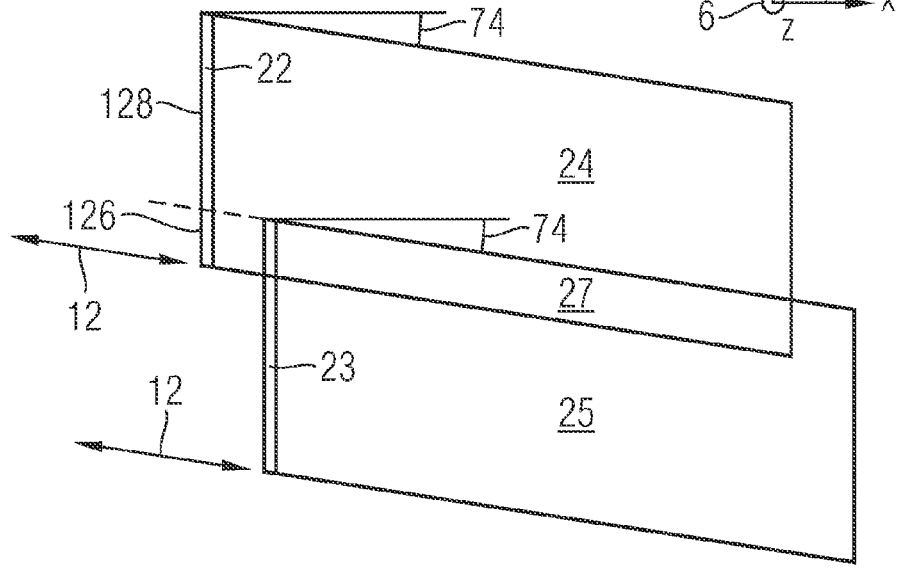

FIGS. 16a and 16b shows schematically an eighth embodiment.

FIG. 17 shows a schematic flow diagram of a method according to the inventive concept for compensating lateral shifts and/or rotations of the stage during a travel of the stage along the scan direction.

DESCRIPTION OF PREFERRED EMBODIMENTS

Figure 1:
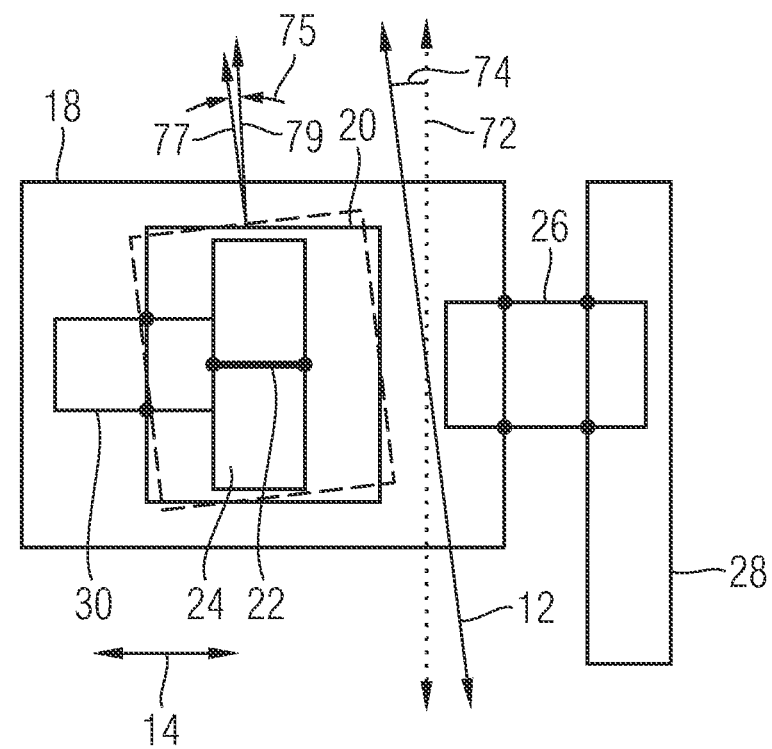
FIG. 1 shows a first schematic top view about an arrangement of basic components of the invention.
Figure 1:
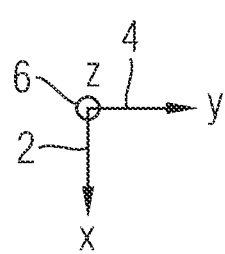

FIG. 1 shows a first schematic top view about an arrangement of basic components of the invention. A stage 18 is used to move a sample 20 up and down in a desired scan direction 72. In reality, the sample 20 is moved in a real scan direction 12. Data is collected along a line 22 perpendicular to the desired scan direction 72. This results in a measurement of data 24 which is preferably a rectangular area 24 with its longest dimension parallel to the desired scan direction 72. Without limitation, in the following it is assumed that the sensor direction 14 is perpendicular to the desired scan direction 72 and vice versa. When there is a small angle 74 between the real scan direction 12 and the desired scan direction 72, the image will shift between movements (see FIG. 3). If there are at least two sensors 22, 23 arranged in a staggered manner, this may result in a double imaging of a portion of the sample 20. Therefore, a measuring device 26 measures any movement in a sensor direction 14 with respect to the fixed world 28, wherein the sensor direction 14 is transverse, preferably perpendicular, to the desired scan direction 72. A controller 30 is used to correct the non-straightness of the travel of the stage 18 and to ensure that the preferred area 24 is indeed detected. If the angle 74 deviates from Zero, the heading 77 of the sample is not kept in parallel to the desired scan direction 72. In addition yaw may occur, which is a rotation angle 75 between the heading of the sample 20 and its travelling direction 12. Line 79 represents a parallel to the real travel direction. If the yaw angle 75 is Zero, the rotation of sample 20, i.e. its heading, equals the angle 74. This deviation may result in strange variations within the detected image. There are two kinds of deviations that should be detected simultaneously and possibly avoided and/or compensated and/or corrected: firstly a translation in sensor direction 14 reached by moving into an erroneous direction 12, and secondly a heading of the sample 20 into an erroneous direction 12. Due to the specific nature of scanners having more than one sensor 22, 23 it is particularly important to have an absolute measure between the angle 74 of the real scan direction 12 and the sensor direction 14. Any variation 74 away from the optimal angle of 90° results in errors. In the following, a number of position detection embodiments are described and it is described how detected position information can be used to correct the image in real time by selecting correct pixels and/or areas 24 from the sensors 22, 23.

Figure 2:
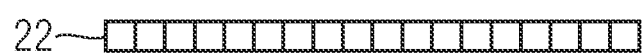
FIG. 2 shows schematically a simplified side view of an optical line microscope.
Figure 2:
Figure 2:
Figure 2:
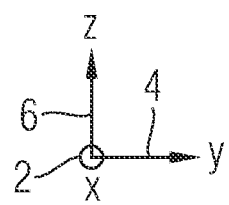

FIG. 2 shows schematically a simplified side view of an optical line microscope 10.

Figure 3:
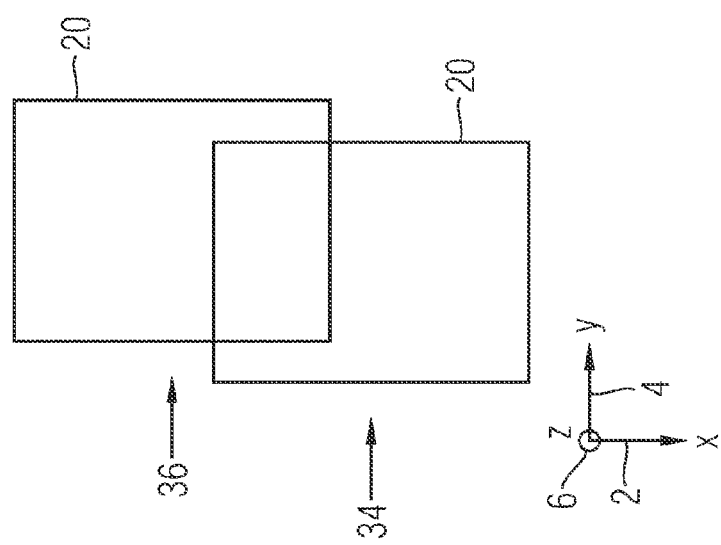
FIG. 3 shows a schematic top view of a displacement of images of a sample taken at different times during the travel of the stage.

FIG. 3 shows schematically a top view of a displacement of images of a sample 20 taken at two different times during the travel of the stage 18. The sample 20 should be scanned along the real scan direction, which is in line with the direction of the x-axis 2. However the stage 18 does not travel completely straight. Therefore, at a first time the sample 20 is at a first position 34 and at a second time at a second position 36. In relation to the first position 34 of the sample 20, the second position 36 of the sample 20 is not only shifted in the real scan direction 12, but also shifted perpendicular to the desired scan direction 72.

Figure 4:
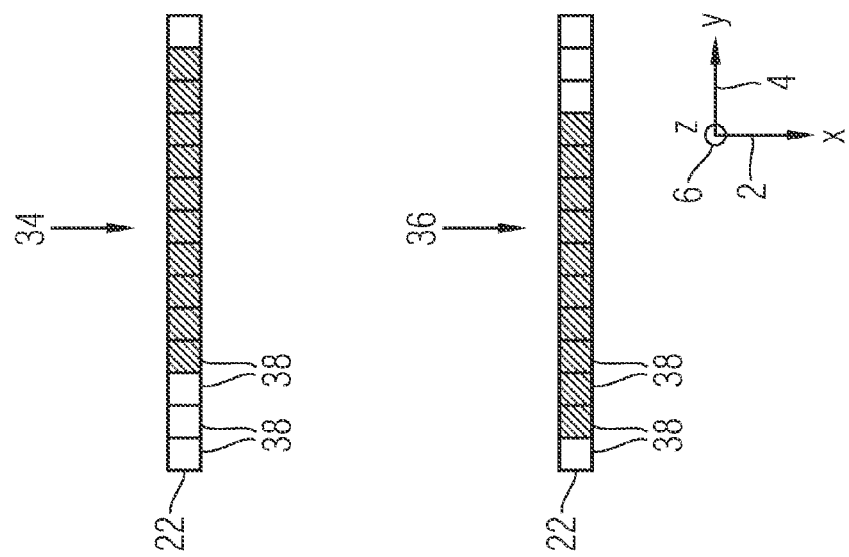
FIG. 4 shows for different moments within a scanning process schematically the image of lines of the sample on a line sensor.

FIG. 4 shows for the two different positions 34, 36 schematically the image of lines of the sample 20 on a line sensor 22. The sample 20 is scanned in the plane of the drawing. Thereby, the sample 20 is imaged with a lens 32, 40 onto a line sensor 22. The image on the line sensor 22 is depicted at different moments in time. When the sample 20 is at the first position 34, the image on the sensor 22 is at the position shown by the hatched pixels 38 in the upper part of the figure. When the sample 20 is at the second position 36, the image 36 on the sensor 22 is at the position illustrated by the hatched pixels 38 in the lower part of the figure. To make a complete image of the sample 20 the hatched pixels 38 in line 22 are used. When the sample 20 reaches position 36 the image on the sensor 22 is shifted as shown in the lower part of the figure (in the illustrated example by two pixels to the left). Then a different subset of pixels 38 is required to make a complete image of the sample 20. This selecting of the correct pixels 38 can be done by software after the data was collected. For high data throughputs, however, it is preferred to perform the selecting on a dedicated hardware platform. For the selecting a field-programmable gate array (FPGA) can be employed. The selecting function can be combined with a routing of the selected data to a storage device, wherein the routing is based on detected position offsets. This method allows a discrete selection of the range of interest (ROI) with pixel accuracy. A residual error of half of a pixel pitch cannot be excluded. In most imaging systems it is expected that this residual error is not readily detectable in the final, resulting image.

Figure 5:
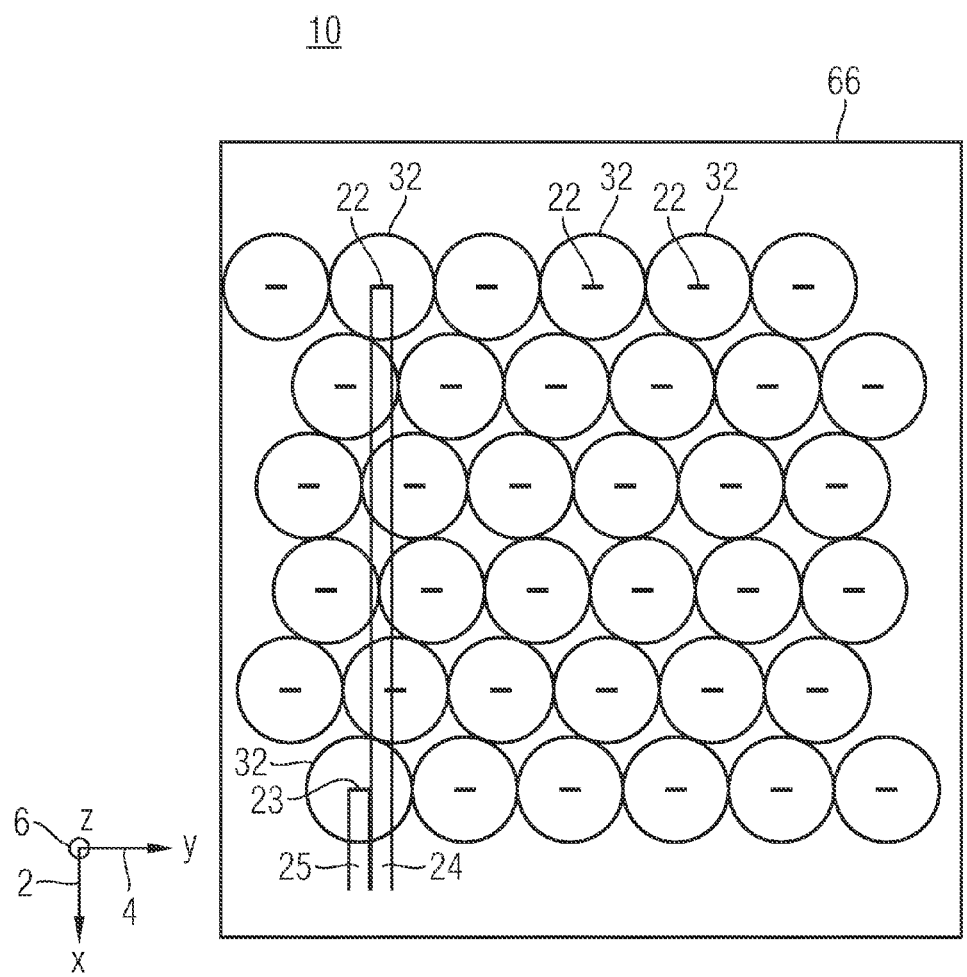
FIG. 5 shows schematically an array of sensors of an array-based scanning microscope.

FIG. 5 shows schematically an array 66 of sensors 22 and lenses 32 or lenslets 32 of an array-based digital scanning microscope 10. This may be a microscope as known from U.S. Pat. No. 7,184,610 B2. Bands 24, 25 show two parts of images that end up next to each other in the final image but are measured at different times and places. For an array-based system the requirements are stricter due to the fact that image formation is often done in a staggered manner. This means that some of the data that ends up at adjacent positions in die final image is measured at very different moments in time, while the complete sample 20 is translated over a large range. This puts extra stringent requirements on the straightness of travel of the sample 20, since the sample 20 should not be translated in the real scan direction 12 by more than what corresponds to a maximal lateral shift of half a pixel pitch over the complete distance between the first and last measurement position. For high resolution applications employing large arrays 66 these requirements can become very strict. For a system with a pixel size of 250 nm using a array 66 of 10 mm this would require a stage 18 with a straightness of travel that is better than 125 nm over 10 mm of travel. Fabricating a system that is able to reach these requirements is expensive. Therefore, a system is needed that can avoid, compensate and/or correct the deviation. Measuring the position of the stage 18 at a single position near the position of the area 24 where the data is collected is not sufficient for array-based microscopes, because for an array-based system two errors play a role, firstly the translation away from the ideal line 72, secondly the rotation 74 of the sample 20. Both degrees of freedom should be compensated and/or corrected.

Figure 6:
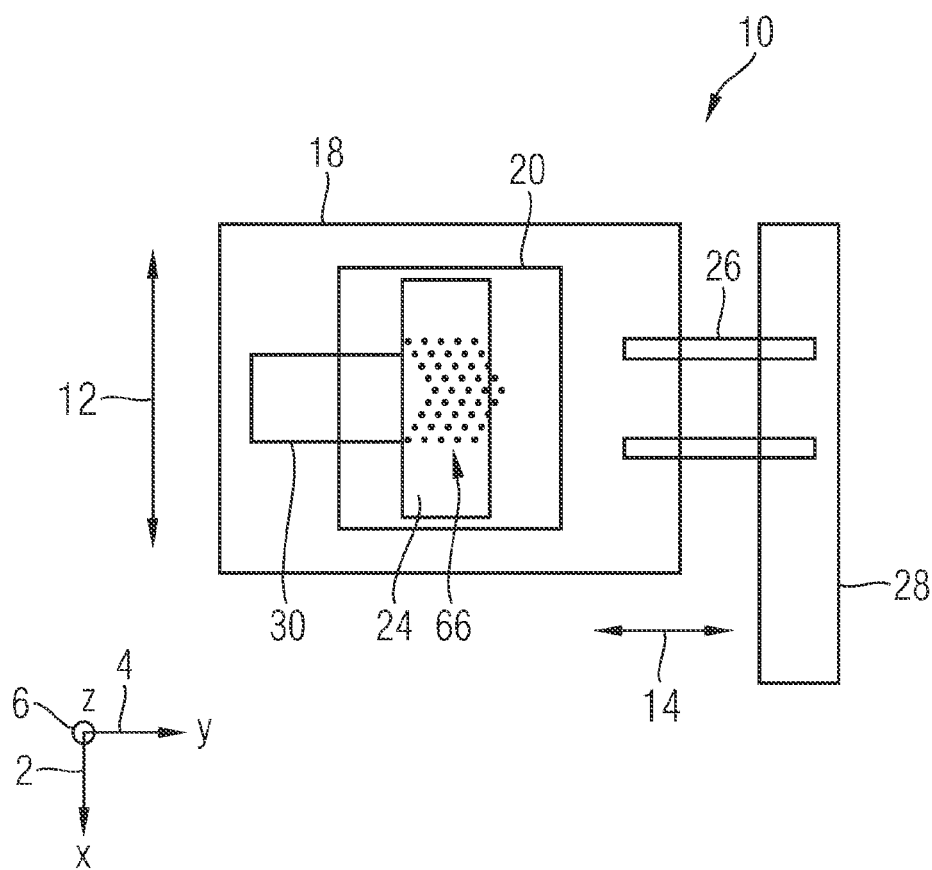
FIG. 6 shows a second detailed schematic overview about an arrangement of basic components of the invention.

FIG. 6 shows a second schematic overview about an arrangement of basic components of the invention. A stage 18 is used to move a sample 20 up and down in a real scan direction 12. While the sample 20 is moved in the real scan direction 12, data is collected along by sensors 22, 23 arrayed in a two-dimensional sensor array 66, as described in U.S. Pat. No. 7,184,610 B2. The sensor array 66 can have various arrangements. A typical sensor array 66 has an array of lines that are perpendicular to the desired scan direction 72. This results in the measurement of data which is preferably a rectangular area 24 with its longest dimension parallel to the desired scan direction 72. Two measuring devices 26 measure at two different positions the deviations of the sample 20 with respect to the fixed world 28. With these two measurements two different variations can be detected: firstly a translation in a sensor direction 14 perpendicular to the desired scan direction 72 and secondly a rotation 74 around a vertical axis of the stage 18. These errors can be corrected via some means 30 to ensure that the preferred area 24 is indeed detected. Various means 26 for detecting the position can be envisioned. The main challenge is related to the fact that the travel in the real scan direction 12 can be very large (several cm) compared to the variation (<100 nm) that is to be measured in sensor direction 14. It is preferred that the measurement of the positions 26 is along a line that is parallel to the detection regions 24. The most preferred arrangement is such that a first sensing means 80 for detecting the lateral position is in line with the first row 22 of the sensor array 66 and a second sensing means 82 for detecting is in line with the last row 23 of the sensor array 66.

Figure 7:
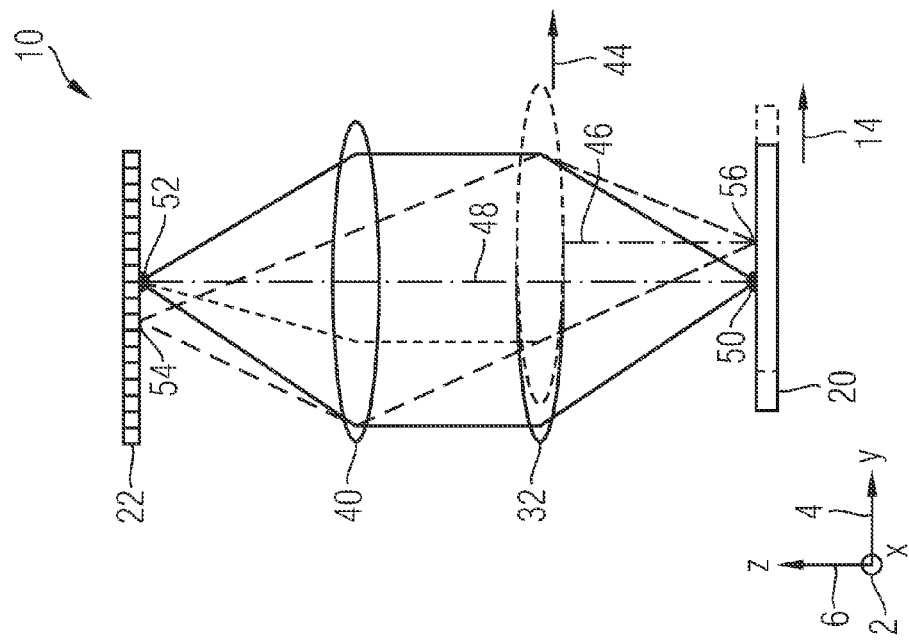
FIG. 7 shows schematically a first embodiment.
Figure 8:
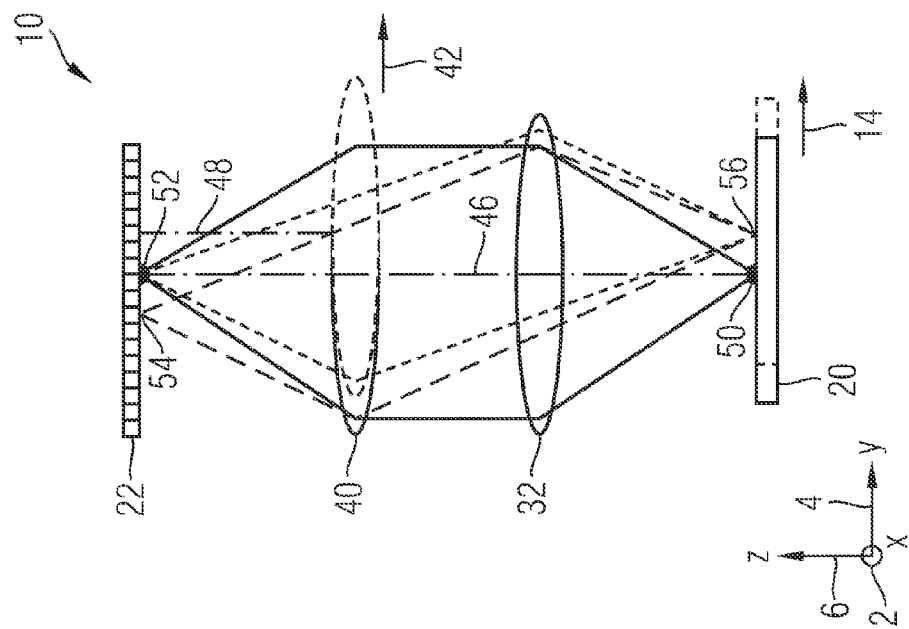
FIG. 8 shows schematically a second embodiment.

FIG. 7 and FIG. 8 show schematically a first, respectively second, embodiment for correcting the image position 54 on the image sensor 22. In a typical scanning microscope 10 there are at least two lenses 32, 40 in the imaging system. Preferably, a first lens 32 and a second lens 40 are faced to each other telecentrally. In this case, a correction can be performed by moving one or both of the lenses 32, 40 in a direction 42, 44 parallel to the sensor direction 14 of a lateral shift of the sample 20 to compensate the lateral movement of the sample 20. Thereby, main axes 46, 48 of the lenses 32, 40 are kept in mutually parallel orientations. The solid line shows the original situation with a point 50 on the sample 20. The long-dashed line is the ray trace where the sample 20 is shifted. This results in a shift of the image on the sensor 22. Thereby, the point 50 on the sample 20 moves in space with a lateral shift and is—in relation to space—now designated as point 56. The corresponding point 52 on the image sensor 22 moves to position 54. The short-dashed line is the resulting ray trace for the situation where one of the lenses 32, 40 is moved to compensate the shift of the sample 20. Thereby, the point 52 on the image sensor 22 stays at its original position 52.

Figure 9:
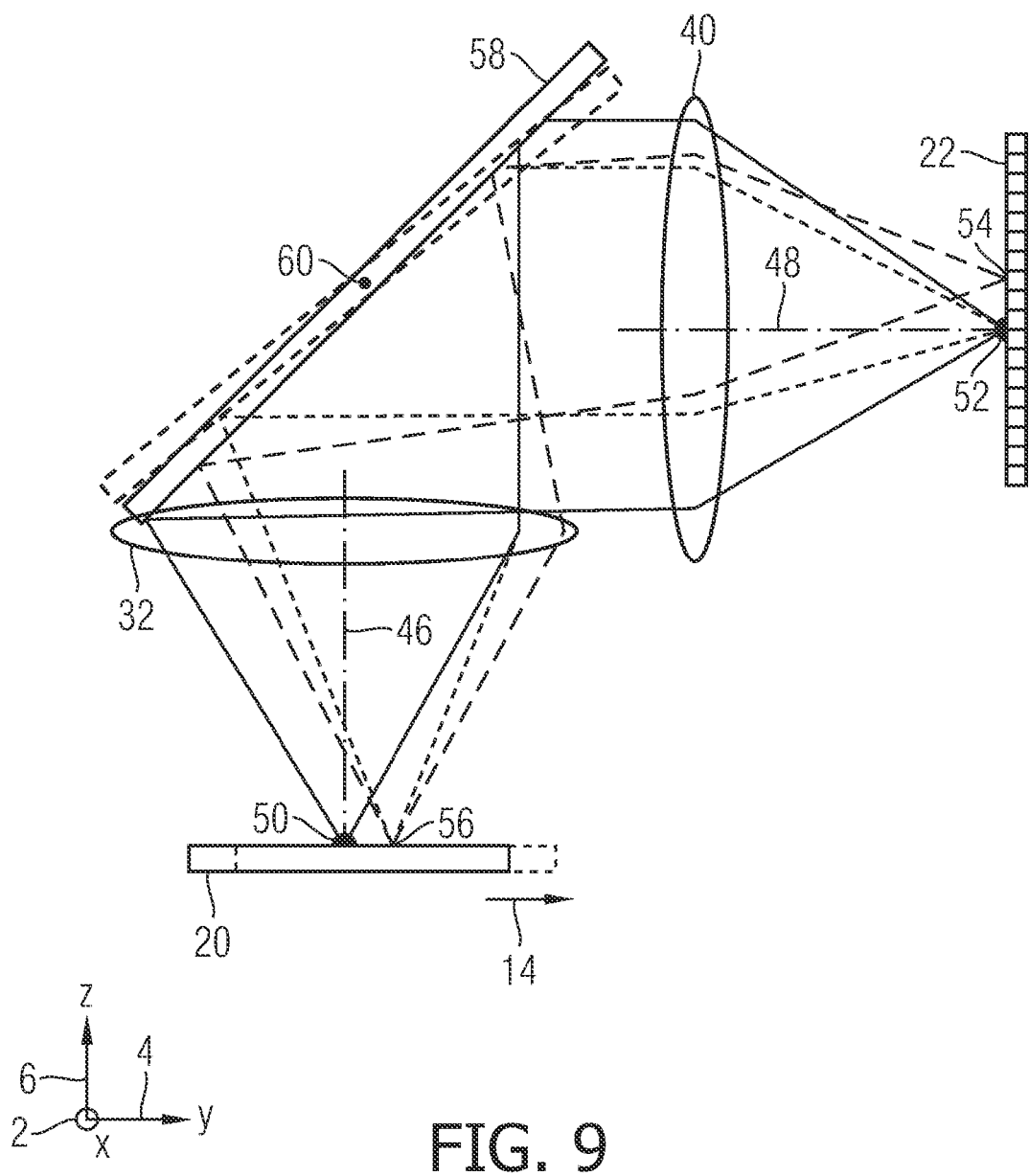
FIG. 9 shows schematically a third embodiment.

FIG. 9 shows schematically a third embodiment for correcting the image position 54 on the image sensor 22. In this embodiment a folding mirror 5 is placed between lens 32 and lens 40. Initially the solid ray trace shows the path from sample 20 to sensor 22. When the sample 20 is moved in sensor direction 14 the deviation is compensated (see short-dashed lines).

Figure 10:
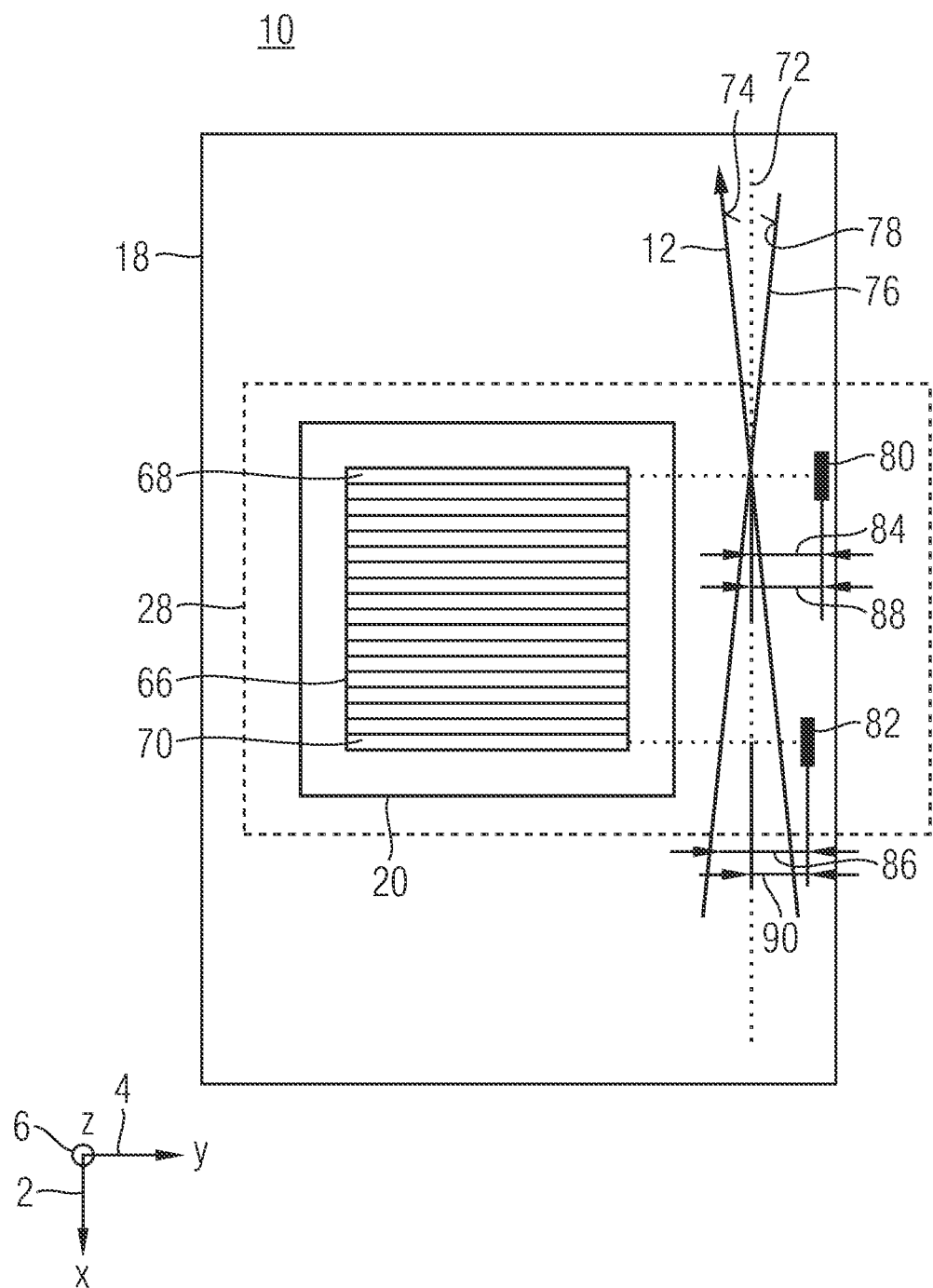
FIG. 10 shows schematically an overview about an arrangement of positions involved.

FIG. 10 shows schematically an overview about an arrangement of positions involved. A fixed reference frame of the sensor array 66 contains the detection area with a number of substantially linear detection regions 68, 70. The desired scan direction 72 is perpendicular to the detection regions 68, 70. Ideally the sample 20 is scanned parallel to the desired scan direction 72. In reality, there may be a small angle 74 between the direction of motion 12 and the desired scan direction 72. This angle 74 will result in a shift of the sample 20, wherein a shift in parallel to the detection regions 68, 70 occurs. It is important to measure the drift away from the ideal position both at the first portion 68 of the array 66 as well as at the end 70 of the array 68 such that this can be compensated even when the angle 74 of the scan direction 12 and/or a yaw angle 75 is varying. Therefore, a reference 76 on the stage 18 is taken, which is preferably parallel to the real travel direction 12 of the stage 18. However a small residual angle 78 may remain. A first sensing means 80 determines a distance 84 (transverse position) between the reference on the stage 18 and a corresponding position on the fixed world 28, inline with the first sensor array 68. A second sensing means 82 determines a distance 86 between the reference on the stage 18 and a corresponding position on the fixed world 28, in line with a second sensor array 70. A calibration of the distance 88, and 90 is required to determine the real deflection of the sample 20 in the frame of reference of the sensor array 66. The calibration can be performed by measuring a sample 20 that contains straight lines that make an angle with the scan direction 12, imaging these lines and simultaneously detecting the position of the reference position 76 by the measuring means 80 and 82. This data can be used to calibrate the distances 88 and 90 as well as to determine the nominal angle between the real scan direction 12 of the stage 18 and an ideal reference line 72 that is perpendicular to the detection lines 68, 70 as well as the offset angle 78 of the reference line 76 or reference position 76 on the stage 18. This information can be stored and used in the next scans to provide the correction factors required for an artefact-free image.

Figure 11:
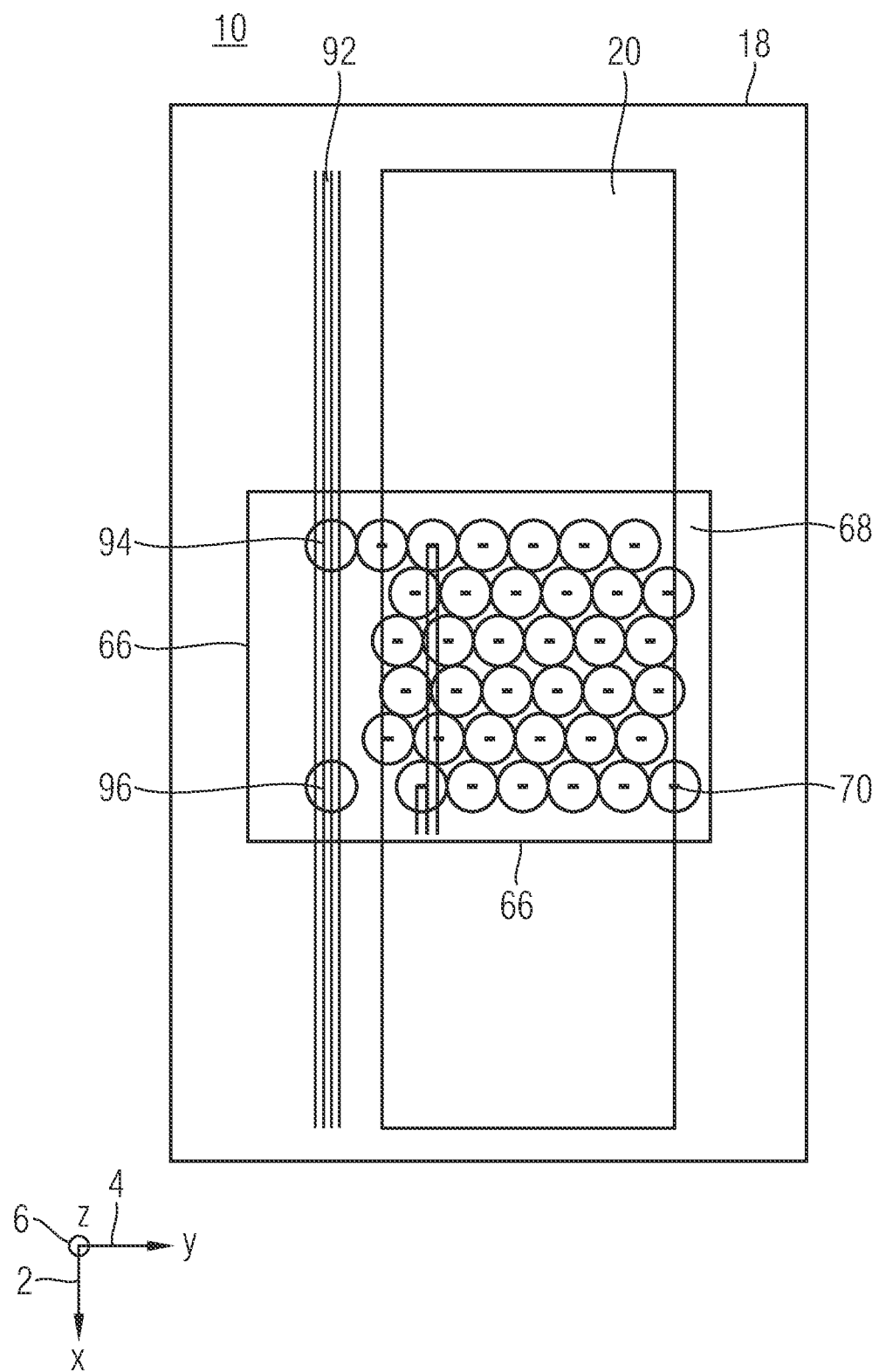
FIG. 11 shows schematically a fourth embodiment.

FIG. 11 shows schematically an arrangement of a fourth embodiment for a detection of the position of the stage 18 by an imaging sensor system 94, 96. The imaging sensor system 94, 96 should be rigidly attached to the detection system 80, 82 for determining the position and drift of the stage 18. The imaging sensor system 94, 96 can be a separate sensor 94, 96 or part of the sensor array 66 that is also used for capturing the data. The stage 18 moves the sample 20 while the imaging system 94, 96 collects the data. On the stage 18 reference lines 92 are placed that can be imaged by two detection means 94, 96 that are in line with or are even using the same sensor array 66. In particular, if the same sensor array 66 is used it is straightforward to determine the distances between the ideal line 72 and the place where the positions 88 and 90 are determined (see FIG. 10). Therefore, no further calibration of the system would be required. This would make this the preferred embodiment if it does not require a larger die for the detection sensor array 66. In order to increase accuracy of the determination of the sample drift, a moiré effect between the lines 92 on the stage 18 and some grating in an imaging path may be used to increase a spatial resolution.

Figure 12:
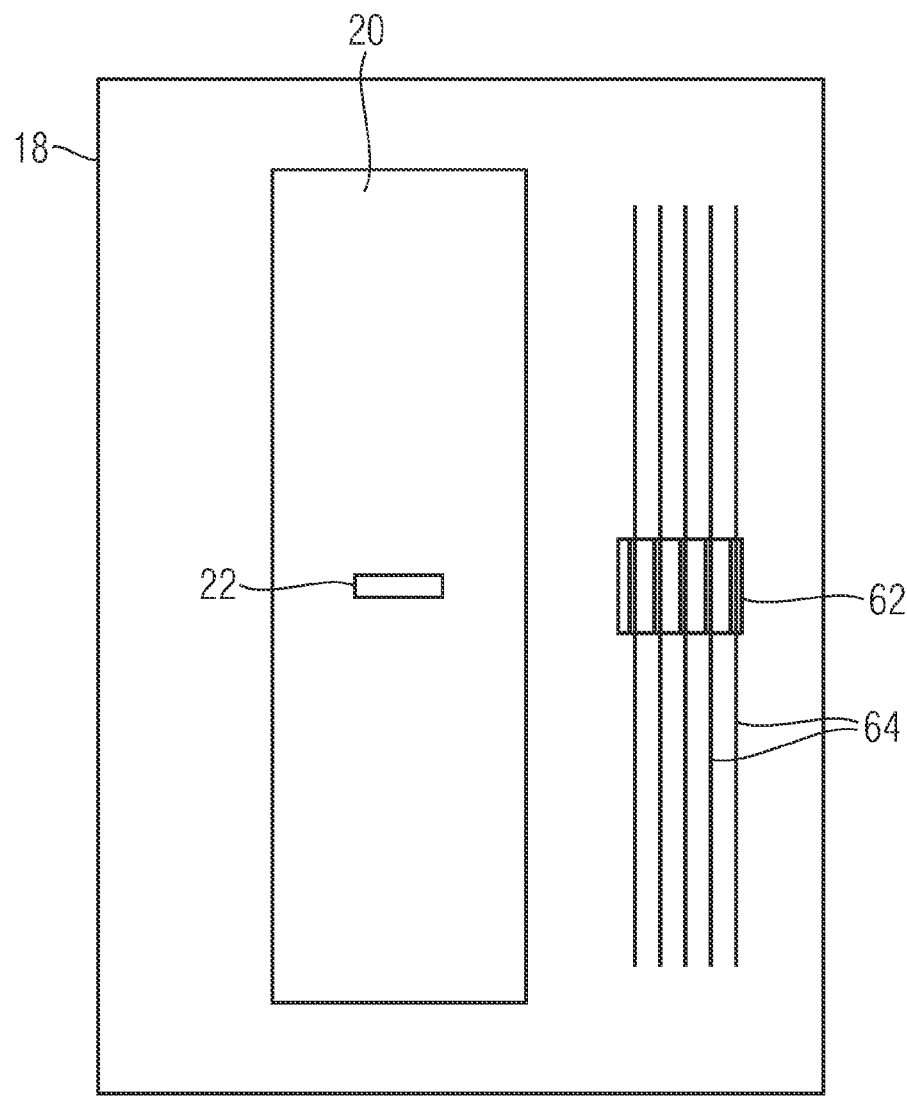
FIG. 12 shows schematically a fifth embodiment.

FIG. 12 shows schematically an arrangement of a fifth embodiment for a moiré-based detection of the position of the stage 18. A suitable means of measuring the position of the stage 18 is the use of a precision linear optical encoder. Optical encoders are readily available high precision rulers, which operate by measuring a moiré pattern that results by overlapping two gratings with a slightly different periodicity. Accuracies of several nanometers can be obtained. The figure shows a possible arrangement for using optical encoders to determine both the offset and angle of stage travel with respect to the ideal path 72. The sample 20 is fixed on the stage 18. One grating 64 of the optical encoder is fixed on the stage 18, the other grating 62 is fixed with respect to the world frame 28 of reference. The important frame of reference is defined by the sensors. It is supposed that the sensor is fixed with respect to the world frame 28 of reference. The optical encoders can read out the relative shift in a position near the position where the line is measured. Because the alignment of the optical encoders is not necessarily exactly along the desired scan direction 72 of the sample 20, a calibration has to be performed to deduce the alignment of the optical encoders with respect to frame of reference of the sensors. Because the sensors are fixed with respect to the world frame 28 of reference, it is expected that a one time factory calibration should be sufficient. The optical encoders read a translation along the horizontal in this figure, while the stage 18 travels along the vertical. This means that the working area of the optical encoders (determined by the height of grating 64) has to be as large as the maximum distance over which the sample 20 is to be translated.

Figure 13:
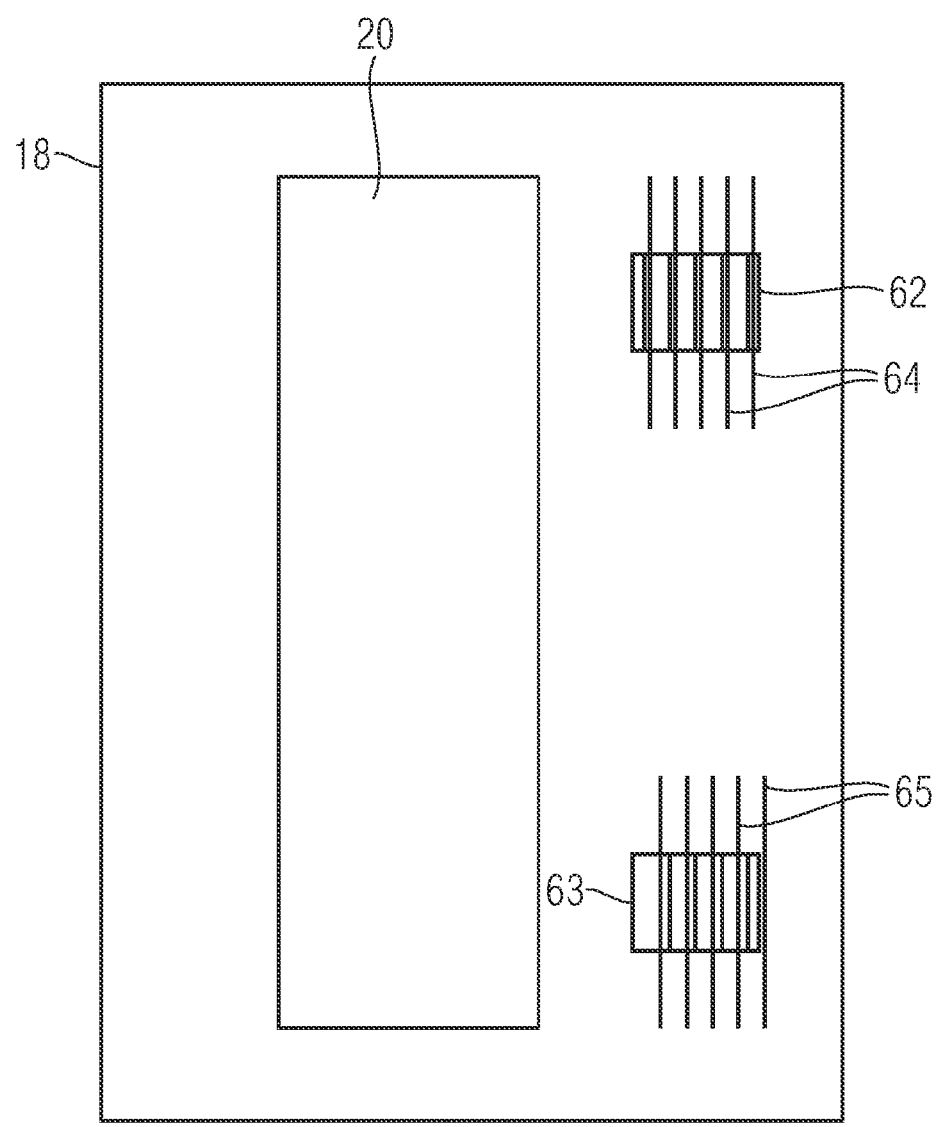
FIG. 13 shows schematically a sixth embodiment.
Figure 13:
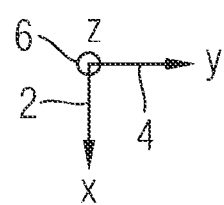

FIG. 13 shows schematically an arrangement of a sixth embodiment for a moiré-based detection of the position of the stage 18. The arrangement comprises at least two optical encoders to determine both the offset and angle 74 of stage travel with respect to the ideal path 72. The sample 20 is fixed on the stage 18. One grating 64, 65 of each optical encoder is fixed on the stage 18, the other grating 62, respectively 63, is fixed with respect to the world frame 28 of reference, it is assumed that the sensor is fixed with respect to the world frame 28 of reference. The important frame of reference is the sensor. Together, the two optical encoders read out the relative shift of a reference point on the stage. This can be a point on the top of the stage 18 and/or a point on the bottom of the stage 18. Because the alignment of the optical encoders is not necessarily exactly along the desired scan direction 72 of the sample 20, and because the optical encoders are not necessarily aligned perfectly with respect to each other, a calibration has to be performed, to deduce the alignment of the optical encoders with respect to the sensor frame 28 of reference. Because the sensor is fixed with respect to the world frame of reference, it is expected that a one time factory calibration should be sufficient. The optical encoders read a translation along the horizontal in this figure, while the stage 18 travels along the vertical. This means that the working area of the optical encoders (determined by the height of grating 64, 65) has to be as large as the maximum distance over which the sample 20 is to be translated. Once calibrated, the optical encoders can be used to determine the angle 74 and the offset of the sample 20 with respect to the ideal travel path 72 (as defined with respect to the sensor).

Figure 14:
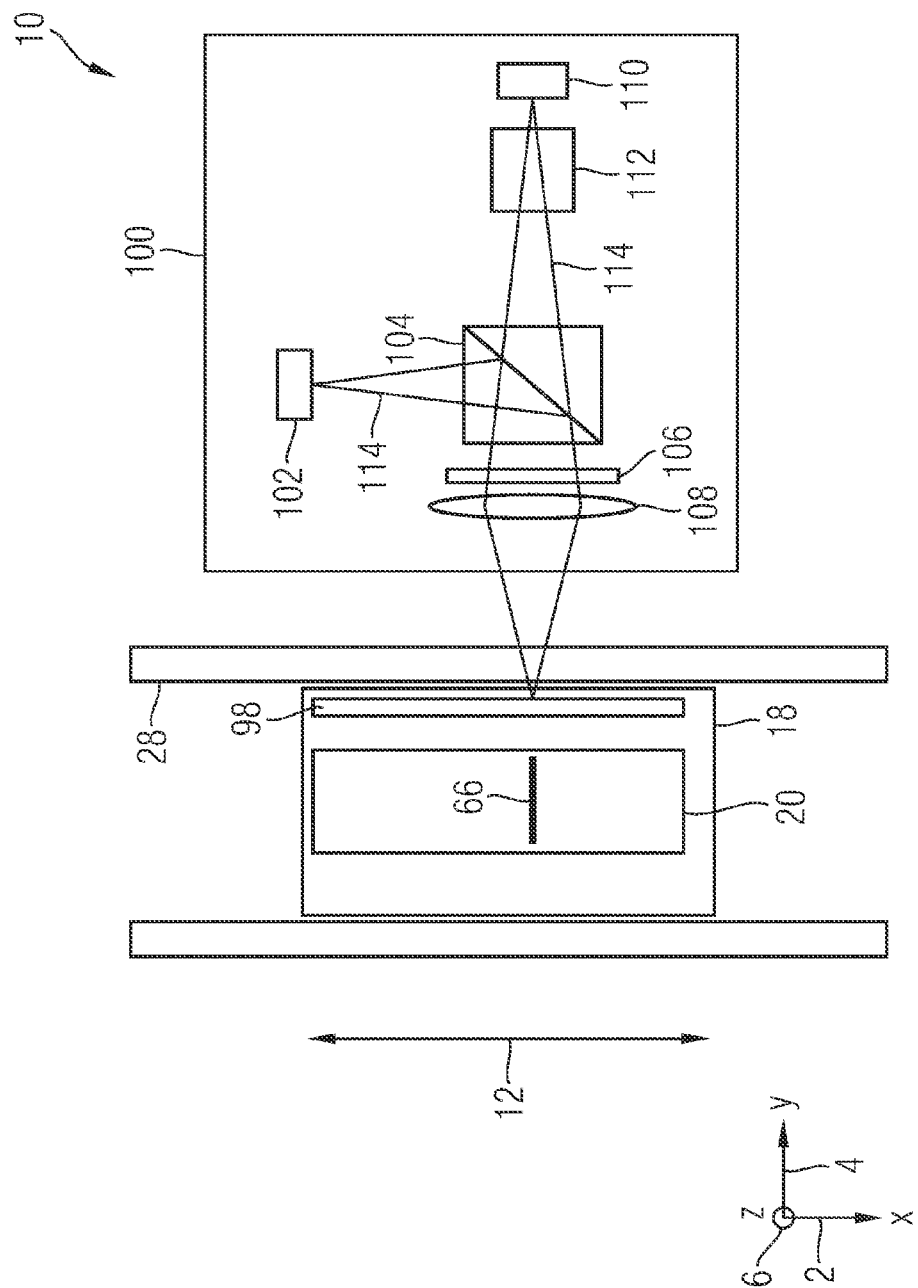
FIG. 14 shows schematically a seventh embodiment.

FIG. 14 shows schematically an arrangement of a seventh embodiment for detecting the position of the stage 20. Therein, the transverse positions 84, 86 of the stage 20 are detected by two imaging systems 100 each having an astigmatic lens 112.

The FIGS. 15a to 15c schematically show footprints of reflected light 114 from a laser 102 on a segmented photosensitive diode 110 for three different positions of the stage 18. The sample 20 is placed on the stage 18 and moved in the real scan direction 12. The distance to the fixed world 28 is measured by placing on the stage 18 a flat reflective surface 98 parallel to the real scan direction 12. For the distance determination a laser 102 is employed, wherein a laser beam 114 is reflected by a polarizing beam splitter 104 before passing through a quarter waveplate 106. The light from the laser is focused towards the reflective surface 98 via lens 108. The reflected light 114 is collected by the same lens 108 and passes again through the quarter waveplate 106 such that it is transmitted through the polarizing beam splitter 104 and focused onto a split diode 110 (detector). Thereby, the beam passes through an astigmatic component 112. The strength of the astigmatic component is such that when the distance between sample 20 and fixed world 28 is at a neutral position, the light 114 falls equally on all four quadrants A, B, C, D of the detector 110 (see FIG. 15b). When the distance increases the shape of the spot will become asymmetric and fall mainly on quadrants A and D (see FIG. 15a). When the distance decreases the shape of the spot will become asymmetric and fall mainly on quadrants B and C (see FIG. 15c). By determining ((A+D)−(B+C))/((A+D)+(B+C)) it is possible to get a signal that scales with the distance from the optimal position. This signal does not depend on an absolute power falling on the detector 110. The response will be only linear over a limited range of distances and should thus be calibrated to get an absolute position measure. By shifting the position of the astigmatic lens 112 or the detector 110 it is possible to have the neutral (zero) signal when the focus of lens 108 is not directly onto the reflective surface 98. This has the advantage that an average position over a larger surface is determined resulting in a signal that is less depended on possible blemishes on the reflective surface 98.

FIGS. 16a and 16b shows schematically an eighth embodiment for adjusting of a region of interest 24, 25. When the precise orientation of the sample 20 (in terms of rotation 74 and offset with respect to an ideal travel path 72 is known, the data acquired from the individual sensor elements 22, 23 can be adjusted in order to form one continuous image of the sample 20, without having artefacts due to non-ideal travel of the sample 20. The figure shows for the two sources of error, variations in the offsets of the lines on the sample 20 imaged by the individual sensor elements 22, 23, and rotations 74 with respect to the ideal travel path 72 of the lines on the sample 20 imaged by the individual sensors 22, 23. The top of the figure shows the area of the sample 20 imaged by two adjacent sensor elements 22, 23, wherein the travel direction 12 of the sample 20 is along the horizontal. The areas 24, 25 imaged by each of the sensor elements 22, 23 are shown as squares.

The overlap 126 between the two sensors 22, 23 is known, as soon as individual positions y1, y2 in the sensor direction 14 perpendicular to the real scan direction 12 of the sensor elements 22, respectively 23, are known. Then, the regions of interest 24, 25 of the sensor elements 22, 23 can be adjusted such that the overlap 27 is discarded. Therefore, a continuous image results. The individual lateral positions y1 and y2 of the sensor elements 22, respectively 23, may change continuously over time, due to rotation 74 of the sample 20 and/or due to a changing offset with respect to the ideal travel path 72. Therefore, the area of data 27 that has to be discarded has to be determined continuously during the scan. The bottom part of the figure shows the error resulting from a rotation 74 of the sample 20 with respect to the ideal travel path 72, wherein the ideal travel path 72 is typically perpendicular to the row of sensor elements 22, 23. The rotation 74 results in a rotation 74 of the lines of the sample 20 imaged by the individual sensors 22, 23 with respect to the desired scan direction 72. The sample rotation 74 has to be determined continuously during the scan. A result of a rotation 74 is an unavoidable loss of resolution in the resulting image in the sensor direction 14 perpendicular to the desired scan direction 72. For both, the correction for offset and for angle 74, there has to be an overlap 27 in the areas 24, 25 of the sample 20 imaged by the different sensor elements 22, 23. The overlap 27 between the areas 24, 25 of the sample 20 imaged by sensor elements 22, 23 changes. The data of the overlap 27 has to be discarded. In the illustrated example only the data of the remaining portion 128 of the sensor element 22 is retained for storage or further processing. The size of the overlap 27 should be determined by a maximum error in angle 74 and/or offset for which the error correction method shall work.

FIG. 17 shows schematically a method according to the inventive concept for compensating lateral shifts and/or rotations 74 of the stage 18 during a travel of the stage 18 along the scan direction 12. In a first step a position and/or an orientation 74 of the stage 18 is detected. In a second step the imaging system for imaging a sample 20 is adjusted in dependence on the detected position 84, 86 of the stage 18 and/or in dependence on the detected orientation 74 of the stage 18. Preferably, the first and second steps are alternately repeated during translation of the stage 18 in the scan direction 12.

The scanning digital microscope 10 having a sample stage 18 can move the sample 20 in one direction 12 (scan direction). Some means of measuring any deviation from the desired scan direction 72 and a means 30 for using a result of the deviation measurement to correct the image by either
   selecting a different part 24, 25 of the region of interest 24, 25, 27 on the sensor 22 to select a correct part 24, 25 of the image, to compensate for the measured deviation in stage position;
   shifting 42, 44 and/or rotating a first and/or a second optical component, such as a first 32 and/or a second 40 lens 32, 40, and/or a mirror 60; or
   shifting and/or rotating the sensor 22 to counteract any lateral shift, respectively rotation 74, of the stage 18 such that there is no relative shift, respectively rotation 74, of the image 24, 25 with respect to the pixels 38 on the sensor 22.

This system can be applied in any scanning digital microscope 10, e.g. for use in digital pathology or (fluorescence) cell imaging for microbiology.

The invention claimed is:

1. A scanning microscope comprising:
   a stage for holding a sample and a sensor array having a plurality of predefined substantially linear detection regions;
   a scan mechanism configured to translate the stage holding the sample between at least two axial positions each associated with a corresponding predefined region of the plurality of predefined substantially linear detection regions, wherein after the translation actual orientation and transverse position of the stage deviates from ideal orientation and transverse position of the stage;
   a probing system configured to probe the corresponding predefined region, and comprising at least one optical element and a photosensor having a readout extending in a sensor direction transverse to the ideal orientation;
   a plurality of position sensors configured to measure the actual orientation and transverse position by measuring a distance between a respective reference point on the stage and a corresponding position on a fixed frame of reference inline with the corresponding predefined region;
   a controller configured to control the probing system to correct for the deviation of the stage from the ideal orientation and transverse position as a function of the measured distance to assure probing of the corresponding predefined region;
   wherein the controller is configured to correct a non-straightness of the translation of the stage.

2. The scanning microscope of claim 1, wherein the at least one optical element includes an astigmatic lens and the photosensor has four quadrants, wherein a strength of the astigmatic component is such that when the measured distance is at a desired position, light falls equally on the four quadrants of the photosensor, and when the measured distance deviates from the desired position, a light spot of the light falling on the photosensor becomes asymmetric and falls mainly on two quadrants of the four quadrants, and wherein a signal from the photosensor indicative of the light spot is used by the controller to shift one of the astigmatic lens and the photosensor to obtain the light spot falling equally on the four quadrants the photosensor.

3. The scanning microscope as set forth in claim 1, wherein each position sensor comprises a first pattern on the stage and a second pattern on an immobile part of the microscope, the first pattern and the second pattern forming a Moiré pattern.

4. The scanning microscope as set forth in claim 1, further comprising a focusing mechanism configured to translate the stage in the sensor direction.

5. The scanning microscope as set forth in claim 1, wherein for every respective position of the at least two axial positions the corresponding predefined region is predefined by an initial position of a first of the at least two axial positions.

6. The scanning microscope as set forth in claim 1, wherein the readout corresponds to the corresponding predefined region.

7. The scanning microscope as set forth in claim 1, wherein the photosensor is configured to collect data for display on the readout.

8. The scanning microscope as set forth in claim 1, wherein the readout is movable in the sensor direction.

9. The scanning microscope as set forth in claim 1, wherein the readout is rotatable.

10. The scanning microscope as set forth in claim 9, wherein the readout is rotatable about a center of the readout.

11. The scanning microscope as set forth in claim 1, wherein the photosensor s movable in the sensor direction.

12. The scanning microscope as set forth in claim 1, wherein the photosensor is pivotable about a vertical axis.

13. The scanning microscope as set forth in claim 12, wherein the vertical axis passes through a center of the readout region.

14. The scanning microscope s set forth in claim 1, wherein the optical element is movable.

15. The scanning microscope as set forth in claim 1, wherein the optical element is selected from at least one of a lens, an array of lenses, and a pivotable mirror.

16. The scanning microscope as set forth in claim 1, wherein the photosensor is an array of photosensors.

\* \* \* \* \*